UNITED STATES PATENT OFFICE.

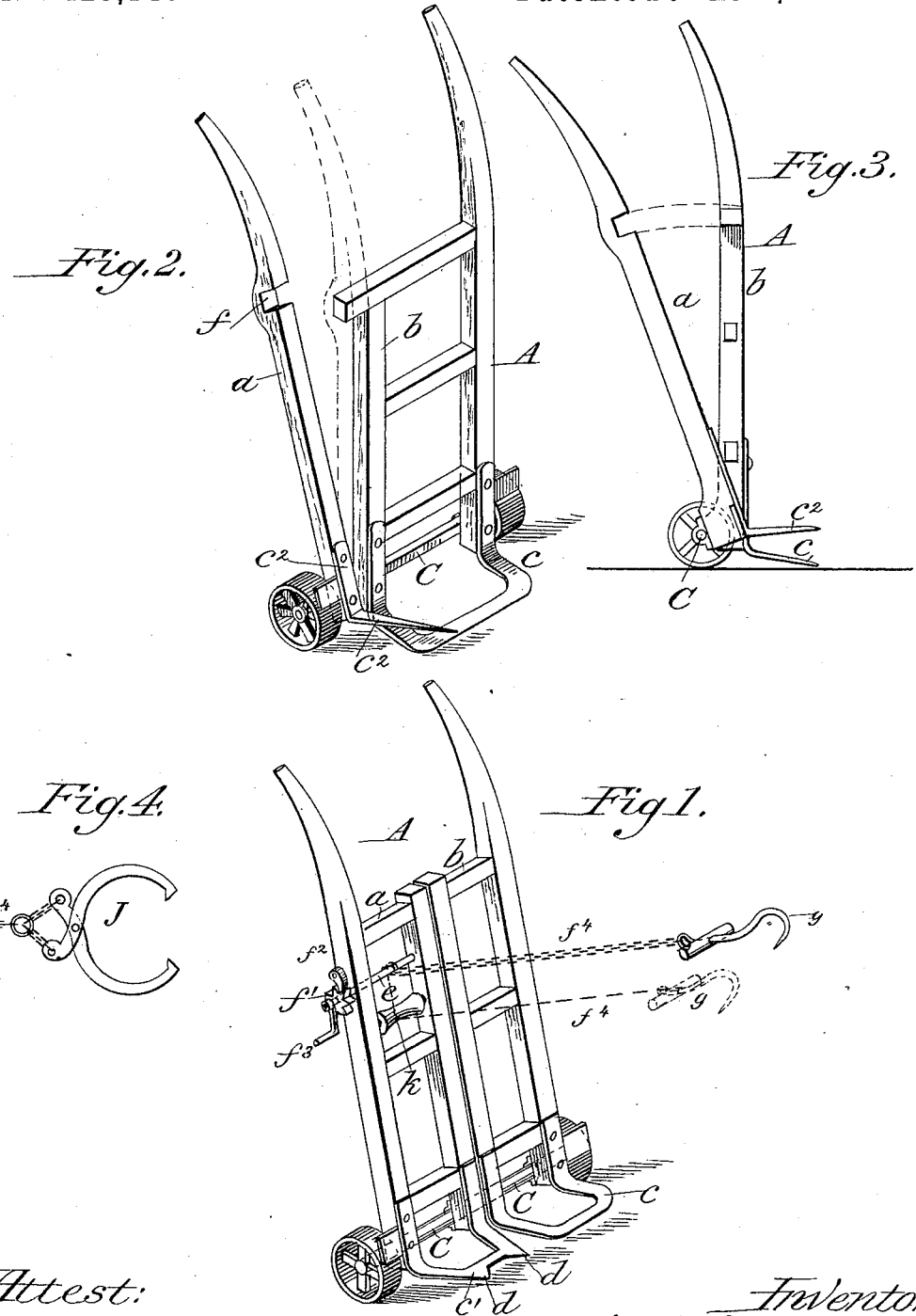

FRANK B. MALLORY, OF FLEMINGTON, NEW JERSEY.

HAND-TRUCK.

SPECIFICATION forming part of Letters Patent No. 429,140, dated June 3, 1890.

Application filed March 31, 1890. Serial No. 346,023. (No model.)

*To all whom it may concern:*

Be it known that I, FRANK B. MALLORY, a citizen of the United States, residing at Flemington, in the county of Hunterdon and State of New Jersey, have invented certain new and useful Improvements in Hand-Trucks; and I do hereby declare the following to be a full, clear, and exact description of the invention, such as will enable others skilled in the art to which it appertains to make and use the same.

My invention consists in a hand-truck having its frame made in two parts or sections, which are suitably applied on a wheeled axle, and one or both separably movable thereon, whereby the manipulation of the truck for loading and unloading is greatly facilitated, and the services of one man, usually employed in assisting in loading, dispensed with; and the invention also consists in certain other novel constructions, combinations, and arrangements of parts, whereby the load to be carried, after being slightly lifted, can be readily and easily drawn onto the truck, as will be hereinafter described and claimed.

In the accompanying drawings, Figure 1 is a perspective view of my improved sectional truck having two equal or nearly equal sections, one of said sections being provided with a gripper and chain and a pawl-and-ratchet mechanism. Fig. 2 is a perspective view of another form of my truck, showing one of the side handle-bars as constituting one section of the truck, the same being pivotally secured to the axle and provided at its extreme lower end with a pointed lifting projection, and its upper portion slightly removed away from the main or body portion of the truck. Fig. 3 is a side view of the same; and Fig. 4 is a view of one form of a gripping-hook especially adapted for use in loading cylindrical bodies, such as barrels and the like.

A in the drawings represents the truck proper, which may be divided into two nearly equal sections, as $a$ and $b$, as shown in Fig. 1, or divided on one side, as shown in Figs. 2 and 3. Both of the sections $a$ and $b$ may be pivotally secured to the axle C, or the section $a$ may be pivotally attached and the section $b$ rigidly secured to the said axle, in either of which cases the two parts or sections may be readily thrown out of line with each other, whereby one section, as $c'$, of the lifting-rack can be forced under or into the load to be lifted, and the load raised a slight distance sufficiently to allow the other lifting-section, as $c$, to be slipped under the load, and the two lifting-racks may then be readily and quickly worked under the said load by moving first one and then the other of said lifting-racks back and forth.

If the truck is made in two equal sections, as in Fig. 1, each of these sections at their lower front ends will be provided with a lifting rack or shoe, as $c\ c'$, and one of these, as $c'$, may be slightly pointed and provided with penetrating projections $d\ d$. If the truck is made as in Figs. 2 and 3, simply one of the handle side bars, as $a$, may articulate on the axle separate from the main body portion of the truck, and this handle side bar may be provided with a rectangular notch $f$ for the reception of the upper cross-tie of the frame of section $b$ and at its lower end with an angular spike $c^2$, intended to answer the same purpose as the sharp-pointed portion $c'$. When articles having a rough exterior, as boxes, barrels, and the like, are to be loaded on the truck, the truck is brought up to such an object and the projections, as $d\ d$ in Fig. 1 or the projections $c^2$ in Fig. 2, forced into or under the load, and, if desired, the projection or projections can be still further forced into the box or other object by the operator pressing his foot against the axle of the truck, and by pulling down on the lever-handle $a$, carrying the projection or projections, the load can be raised a sufficient distance from the ground to permit the lifting-section $c$ to pass under said box or load. Where articles which would not permit of the projection being driven into them are to be loaded, such projection would be dispensed with and such articles lifted by running one of the lifting-racks under the same and repeating the manipulating operation of loading, as heretofore described. When the load is raised, as described, and placed upon the lifting-racks of the truck, it is then simply necessary in the case of small objects being loaded to bear down upon the handle-section $a$, and thereby bring the load in a position on the truck for being carried; but for loading large and bulky objects, or those having a preponderating weight backward, I employ a revolving windlass-chain shaft $e$, suitably secured to one of the sections, as $a$, of the truck, as shown in Fig. 1. At one end of this shaft is provided a ratchet-wheel $f'$, pawl $f^2$, and handle $f^3$, and to this shaft a chain $f^4$ is attached, and at the end of the chain a suitable gripping-hook, as $g$, is applied. In using the chain, ratchet-wheel, and pawl mechanism, I place the hook or gripper over the front top corner of the box or other object being loaded onto the truck, and by winding up the chain on the windlass the box or other object will be readily loaded, and the pawl, catching into one of the gear-teeth, will automatically lock the windlass and prevent the chain unwinding, thus retaining the load in position on the truck. On the section, as $a$ in Fig. 1, a short distance below and in line with the windlass, I provide a roller $k$, in order to adapt the truck provided with said windlass $f$ for use in loading smaller boxes and the like. When such articles are to be carried, the chain and hook are passed under the said roller $k$ and the gripper fastened over the front top end of the box, and by winding up the chain the box will be easily drawn over onto the main body portion of the truck. When large or high boxes are to be loaded, the chain need not be passed under the roller $k$, but may be run out straight from the windlass; but when barrels or other cylindrical objects are to be placed on the truck, a gripper-hook J, as shown in Fig. 4, somewhat similar to ice-tongs in construction, might be employed to advantage.

In Figs. 2 and 3 I have shown the truck divisible at one side, the sections being so arranged as to come together when the truck is loaded. This construction is substantially the same as that shown in Fig. 1, except that simply one of the handle side bars of the truck is divisible from the main body portion, and that at the extreme lower end of the pivotally-movable lever-handle section, as $a$, is provided a sharp-pointed spike adapted for lifting objects during the act of loading the truck, and, furthermore, that one of the sections of the lifting-rack, as $c$, is of ordinary construction.

My invention can be modified in its form without departing from the principle thereof by pivotally attaching on the side of any ordinary truck a hand-lever lifting-bar having a sharp penetrating point or points, such as is shown in Figs. 2 and 3 of the drawings, and in such construction the pivot of the hand lifting-lever might be the axle or an independent pin suitably located. I, however, prefer the construction shown.

What I claim is—

1. A hand-truck formed of two longitudinally-separated hand-lever sections, one or both of such sections being pivotally attached to the horizontal axle and adapted to be swung vertically downward and upward independently of each other, substantially as described.

2. A wheeled hand-truck formed of two longitudinally-separated hand-lever sections, one or both of which are pivotally secured to the horizontal axle and adapted to be swung vertically downward and upward independently of each other, and one of said sections provided with one or more sharp spur lifting-points and the other with a lifting-rack, substantially as described.

3. The combination, with a wheeled hand-truck formed of two longitudinally-separated hand-lever sections, one or both having pivotal connection with the axle, of the windlass-chain shaft, ratchet-wheel and pawl mechanism, and a chain having a hook or gripper on its free end, substantially as described.

4. A sectional hand-truck having one of its sections constructed to vibrate on its horizontal axle, wheels, or rollers, and its other portion formed as a hand-lever section and adapted to be vibrated in an upward and downward direction at will by hand independently of said first-mentioned section, substantially as described.

5. The combination, with the axle and lever-frame portion of the truck, of a hand-lever adapted to be swung downward and upward, and having a sharp angularly-set penetrating point or spur, substantially as described.

In testimony whereof I hereunto affix my signature in presence of two witnesses.

FRANK B. MALLORY.

Witnesses:
C. C. DUNHAM,
I. DUNHAM SLOGON.